United States Patent [19]
McCrory

[11] Patent Number: 5,435,956
[45] Date of Patent: Jul. 25, 1995

[54] IN-MOLD DEGATING METHOD AND APPARATUS

[75] Inventor: Harold F. McCrory, Evart, Mich.

[73] Assignee: Textron Acustar Plastics, Inc., Evart, Mich.

[21] Appl. No.: 164,557

[22] Filed: Dec. 10, 1993

[51] Int. Cl.$^6$ ............................................. B29C 45/38
[52] U.S. Cl. ....................... 264/161; 264/163; 264/334; 425/292; 425/298; 425/441; 425/554; 425/DIG. 51
[58] Field of Search ................... 264/161, 163, 334; 425/DIG. 51, 554, 553, 556, 292, 298, 441, 577; 249/66.1

[56] References Cited

U.S. PATENT DOCUMENTS

| 3,737,271 | 6/1973 | Novak | 425/DIG. 51 |
| 4,446,088 | 5/1984 | Daines | 425/292 |
| 4,647,275 | 3/1987 | Lundquist | 425/553 |
| 4,738,613 | 4/1988 | Eichlseder et al. | 425/556 |
| 5,069,832 | 12/1991 | Okumura et al. | 264/23 |

FOREIGN PATENT DOCUMENTS

| 3444532 | 6/1986 | Germany | 264/334 |
| 59-26233 | 2/1984 | Japan | 429/292 |
| 61-172716 | 8/1986 | Japan | 425/553 |
| 62-214917 | 9/1987 | Japan | 425/554 |
| 63-252711 | 10/1988 | Japan | 425/553 |

Primary Examiner—Jay H. Woo
Assistant Examiner—Robert B. Davis
Attorney, Agent, or Firm—Reising, Ethington, Barnard & Perry

[57] ABSTRACT

An apparatus and method for degating an injection mold high aspect ratio injection mold plastic article includes a pair of spring biased mold inserts locatable against opposed sides of a runner following initial mold opening movement and wherein one of the pair of mold inserts has a cutting edge and a first operative position engageable with the part following solidification thereof for supporting the part within the mold along an edge portion thereof that is joined to the runner; and wherein the other of the pair of mold inserts has a cutting edge that cooperates with the cutting edge of the one mold insert following mold opening to cut the runner from the part during the ejection of the solidified part. The method includes the steps of forming an injection molded part between first and second mold parts when they are in a closed position by directing molten plastic through a runner leading to an edge portion of the part; clamping the part on one side of the runner prior to opening of the molds and delaying ejection of the part from the mold during the aforesaid clamping of the runner and then moving the first and second inserts in opposite directions across the runner for shearing the runner from the part along the one edge portion thereof.

10 Claims, 2 Drawing Sheets

IN-MOLD DEGATING METHOD AND APPARATUS

FIELD OF THE INVENTION

The present invention relates to injection molding of plastics and more particularly to apparatus and a method for degating a runner from the peripheral edge of a molded plastic article prior to ejection of the solidified article and runner from the mold apparatus.

BACKGROUND OF THE INVENTION

In the manufacture of plastic parts by injection molding, in order to uniformly direct molten plastic to form parts, it is often desirable to flow the molten plastic through a runner system for feeding the molten plastic into a mold cavity along an elongated edge portion of the part.

In the past, various proposals have been suggested for degating side gate runners from plastic parts during the molding process. In U.S. Pat. No. 5,069,832, high frequency vibration is applied to a mold punch after a gate has been sealed and wherein the vibrational energy softens the plastic around the gate to degate the solidified part while in the mold.

U.S. Pat. No. 4,647,275 discloses a runner shearing assembly that includes a cylindrical sleeve having a punch directed therethrough for shearing a runner from a part. However, in this arrangement, the punch has the shape of the cylinder so as to shear a runner from the part. The gate portion between the shear pin and the cylinder is retained on the part and broken therefrom at a pin-shaped gate during the ejection of a solidified part from the mold.

While the aforesaid degating apparatus and methods are suitable for their intended purpose with the shaped parts illustrated in the aforesaid patents, such in-mold degating assemblies and method are not suited for the manufacture of injection molded parts having side gate runner systems and including a gate portion for feeding molten plastic material into a mold cavity along a long longitudinal edge portion of the part. Such parts often have an aspect ratio greater than 1:1 wherein the runner is connected to an extended length of one side of the solidified part. In order to trim the runner, an operator must knife cut, in a repetitive manner, runners from the side edge of the parts. Such repetitive cutting steps can cause undesirable edge nicks leading to excessive scrap. Additionally, repetitive cutting operations are a known cause of carpal tunnel syndrome.

SUMMARY OF THE INVENTION

Accordingly, it is an object of the present invention to provide an improved degating apparatus and method for removing solidified molten parts from a mold assembly wherein the part includes a side runner system for providing molten material to a mold cavity along an elongated longitudinal edge portion of such a part.

Yet another object of the present invention is to provide such improved apparatus and methods by the provision of an apparatus providing first and second inserts to selectively clamp a runner that leads to the longitudinal edge of the part following solidification of the part to assure that the runner is clamped at an extended length longitudinal side edge by first and second shearing edges formed on first and second inserts that are operative during the ejection of the part from the mold apparatus.

A feature of the present invention is to provide a first insert in a movable mold part that will clamp against one side of a runner following solidification of a plastic part in a mold assembly and wherein a second insert is operated by a mold ejector to remove the solidified part from the mold assembly and includes a component that will delay ejection until the first insert has clamped against one side of the runner and thereafter causes the second insert to cooperate with the first insert to provide a shearing action across the runner along a longitudinal edge portion of a solidified part for shearing the runner from the solidified part along a longitudinal edge portion thereof.

Still another feature of the present invention is to provide an accurate and clean cutting degating method for use with solidified plastic parts having a runner system for providing molten material into a mold cavity along a longitudinal edge of the part wherein the method includes the steps of: filling the cavity of a mold with a molten plastic along an elongated gate path between a fixed mold half and a movable mold half at the edge portion of a high aspect ratio part to be formed within the cavity space formed between the fixed mold half and the movable mold half.

A further feature is to provide such a method further comprising the steps of: spring biasing a first insert against one side of the runner at the longitudinal edge of the part prior to ejection of the part from the mold assembly when the movable mold is opened; and wherein the method includes the steps of first securing one side of the runner against a shearing edge prior to opening of the mold halves following solidification of a plastic part therein; delaying application of a second shearing action on the opposite side of the runner until the runner is held in place on the first side thereof; and thereafter applying a shearing action against the opposite sides of the runner along the edge of the part for removing the runner from the part as it is being ejected from the mold.

In the method first and second spring biased inserts are provided one of which is located in one of the mold halves and the other in the other of the mold halves.

The first insert includes a clamping portion that engages one side of a solidified part. The first insert further includes an elongated eagle's beak cutting edge thereon that extends along the length of the runner system feeding the longitudinal edge of a cavity in which the part is formed. The other of the inserts is connected to an ejector plate that is movable upon initial opening of the mold halves. The ejector plate is connected to the second insert only following clamping of the first insert against one side of the runner and thereafter the second insert moves to engage and remove the part from the mold halves during opening thereof while providing a shearing action on the opposite side of the runner at the juncture thereof with the longitudinal edge of a solidified part to provide a shearing action between the cutting edge on the first insert and the cutting edge on the second insert that will smoothly cut the runner from the longitudinal edge of the part along a clean cut line that does not require further post-treatment of the edge to form a finished part appearance upon.

The present invention simplifies production of injection molded parts having a high aspect ratio, e.g., length dimensions greater than width dimensions, and including a system for feeding plastic into a mold cavity along an elongated longitudinal path. The runner system that supplies the mold cavity is formed to efficiently flow molten plastic into all parts of the mold cavity to form a part by an injection molding operation; and the method and apparatus for degating the runner along the longitudinal edge of the part is operative so that there is no secondary finishing operation required on the part. That is, the method and apparatus of the present invention provide a finished high aspect ratio part having a longitudinal edge portion thereon across which molten material was passed through a runner system and wherein the runner is removed from the part by a clean cut that will result in a near net shape manufactured part. As a result, cycle times for manufacturing injection molded articles is reduced and productivity is therefore increased.

BRIEF DESCRIPTION OF THE DRAWINGS

A preferred exemplary embodiment of the present invention will hereinafter be described in conjunction with the appended drawings wherein like designations denote like elements, and.

DESCRIPTION OF THE PREFERRED EMBODIMENTS

Figure 1:
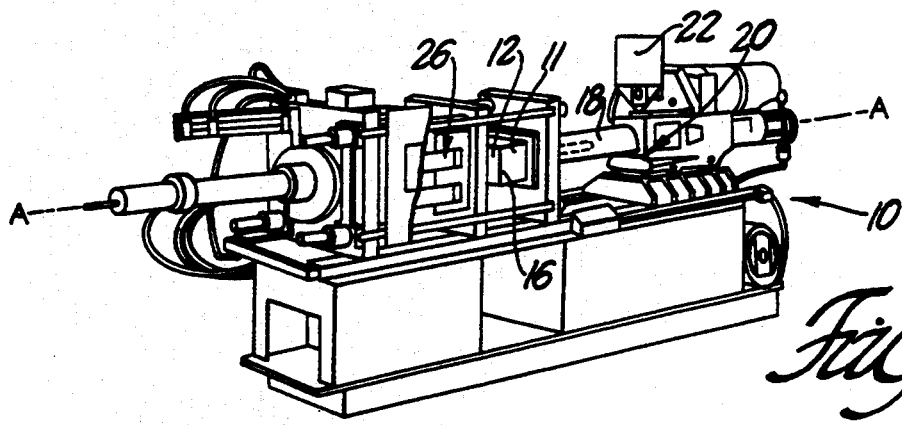
FIG. 1 is a diagrammatic perspective view of mold apparatus including the present invention.
Figure 4:
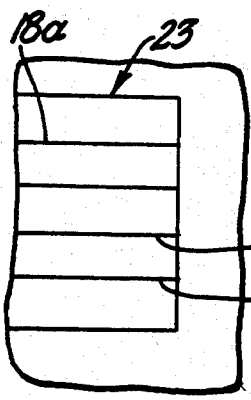
FIG. 4 is an enlarged elevational view of a runner system on one of the mold halves.

FIG. 1 illustrates a representative injection mold assembly 10 comprising two mold parts 11 and 12 that are relatively movable by known means along a horizontal axis AA. A cavity 14 is formed between the two mold parts 11 and 12 when they are closed.

The mold parts 11, 12 are separated along a parting line 16 to assume an open position as shown in FIG. 1 prior to and following formation of a solidified plastic part within the mold cavity 14.

Figure 6:
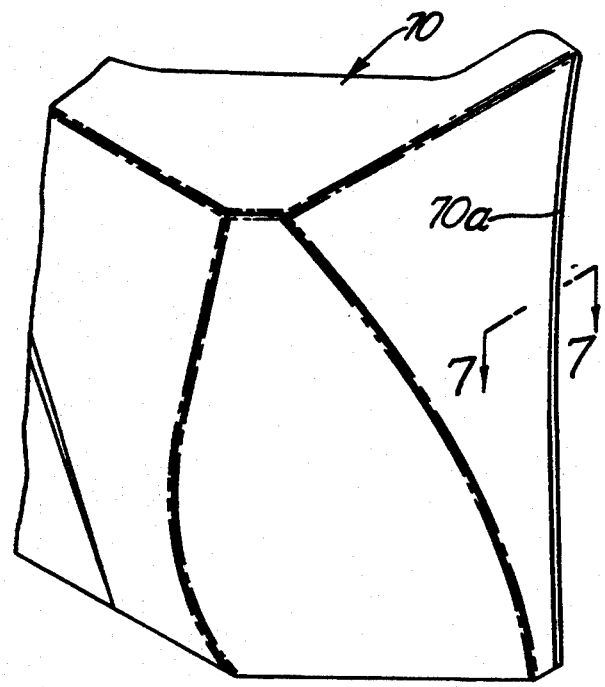
FIG. 6 is a fragmentary perspective view of a part finished by the degating assembly and method of the present invention.

In accordance with certain principles of the present invention, the mold assembly 10 includes a passage 18 for supplying molten plastic from an injector 20 from a feed supply hopper 22. The injector 20 flows molten plastic into the passage 18 through an elongated side flow runner system 23 leading to the inlet edge 24 of a high aspect ratio part 70 (shown in FIG. 6) that is formed during operation of the mold apparatus of the present invention. The passage 18 enables a stream of molten plastic to flow evenly into the inlet edge 24 so as to fill the mold cavity 14 that defines a part leaving a longitudinally direct side edge.

The present invention further includes a mold part ejector assembly 26 including an ejector plate 28 that is sequentially moved with respect to the mold part during a part ejection sequence to be described. The ejector plate 28 supports spaced springs 30, 32.

Figure 3:
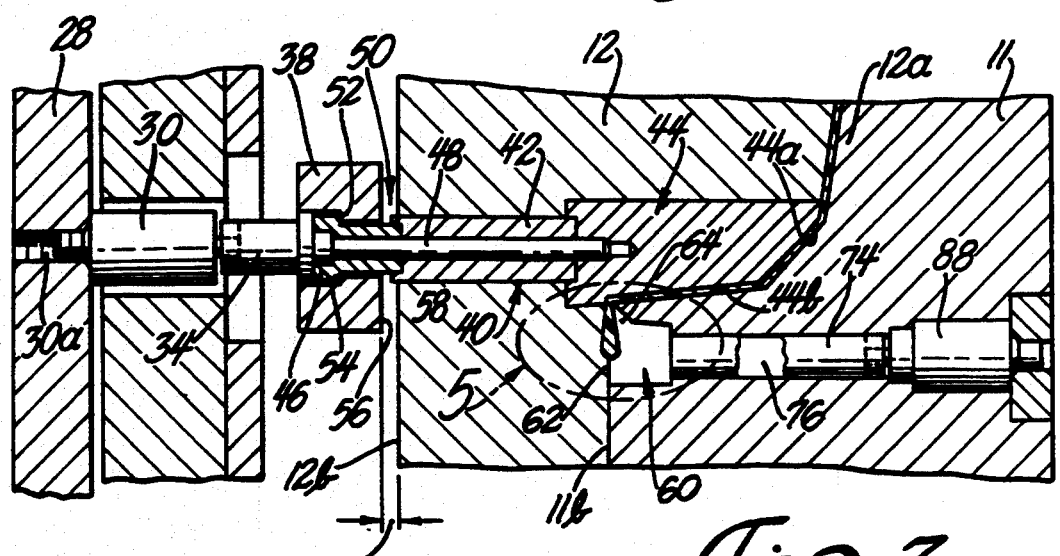
FIG. 3 is a cross-sectional view taken along the line 3—3 in FIG. 2 looking in the direction of the arrows.

Each of the springs 30, 32 are threadably connected at one end thereof by connectors 30a and 32a to the ejector plate 28. The opposite ends of springs 30, 32 are connected, respectively, to spacers 34, 36. The spacers 34, 36 locate a retainer plate 38 of the mold part ejector assembly 26 in spaced relationship to one side 12b of the mold part. The retainer plate 38 is carried by a lifter assembly 40 that includes a lifter rod 42 seated in one end of a first insert 44 and connected to a lifter head 46 at the opposite end thereof. In the illustrated embodiment, the first insert 44 is carried in mold part 12. The lifter head 46 and lifter rod 42 are secured to the first insert 44 by a connector bolt 48 that is directed therethrough to be threadably connected at the first insert 44 as best shown in FIG. 3.

In accordance with one aspect of the present invention, the lifter head 46 and retainer plate 38 are interconnected at a lost motion connection 50. The lost motion connection 50 is defined by coacting surfaces 52, 54 formed respectively on the lifter head 46 and the retainer plate 38. The coacting surfaces 52, 54 locate the retainer plate 38 in spaced relationship to the lifter rod 42 when the mold parts 11, 12 are closed. The retainer plate 38 is thereby spaced by a lifter travel dimension L as shown in FIG. 3 that, initially, will prevent ejection of the part from the mold assembly following opening movement between the mold parts 11, 12. Following a time delay, an inboard surface 56 on the actuator/retainer plate 38 engages an end surface 58 on the lifter rod 42 to initiate the actual ejection of the part from the mold. The purpose of the lost motion connector 50 will be described further when the method of the present invention is described.

In addition to the first insert member 44, the present invention includes a second insert 60 that is supported within the second mold part 11. The insert includes a clamp portion 62 and elongated beak portion 64 having a shearing or cutting edge 66 thereon that will engage the outboard surface of runner material that is formed within the gate passage 18.

The shearing or cutting edge 66 is located at a juncture 68 that is formed between a finished part 70 having a high aspect ratio to be described and a solidified runner 72 that is formed along the gate passages 18a, 18b, 18c that lead to the inlet edge 14a of the mold cavity 14 in which is formed the finished part 70.

In the illustrated arrangement, the insert 60 is carried on a pair of driver members 74, 76. The insert member 60 also is connected to a pair of stripper bolts 80, 82 that have head portions 80a, 82a thereon that are spaced with respect to the mold part 11 at a surface 11a thereon to provide for desired insert travel whereby the insert 60 will move outwardly of the inboard face 11b of the mold part 11 for ejecting the runner material 72 therefrom following its separation in the practice of the present invention.

Figure 2:
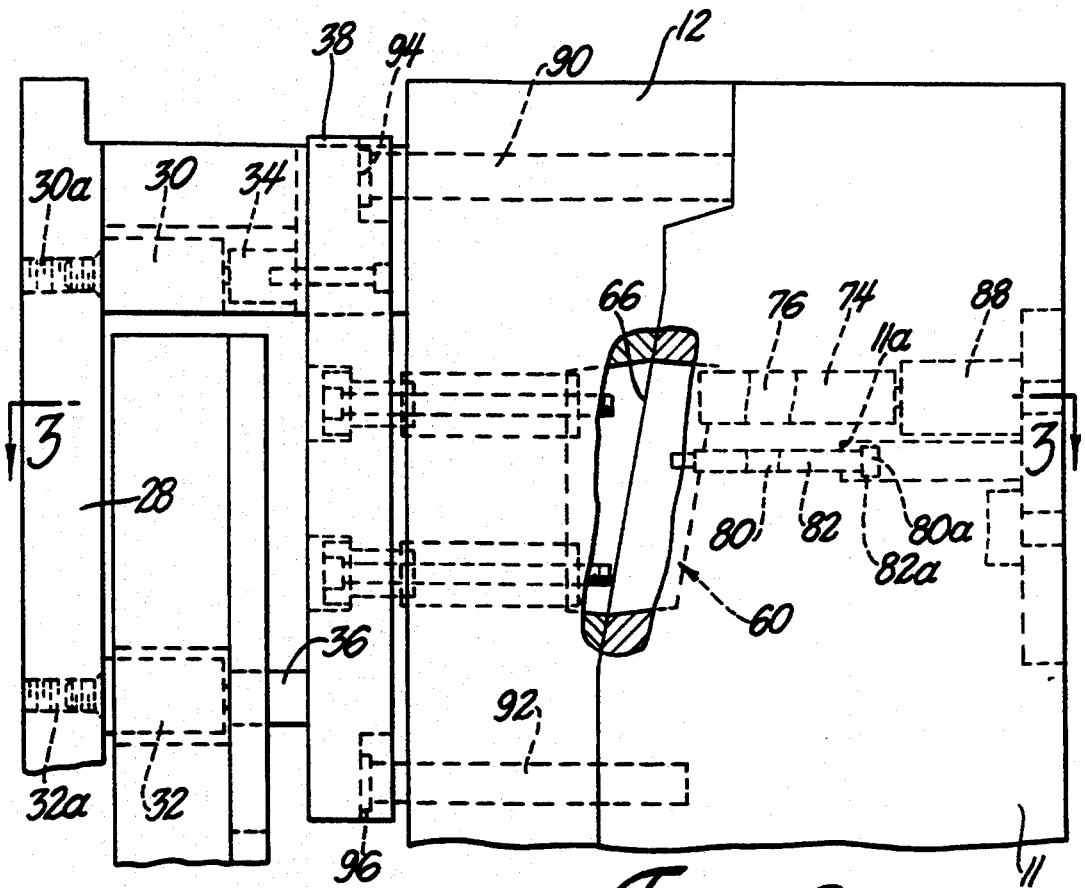
FIG. 2 is an enlarged fragmentary top elevational view, partially broken away and partially sectioned when the mold halves are closed and when shearing edges of the degating assembly are located in an abutting inclined relationship along the longitudinal edge of a high aspect ratio solidified injection molded part formed therein.

As shown in FIG. 2, the shearing or cutting edge 66 on the second insert 60 is inclined at an angle with respect to the edge 14a that defines an edge 70a on the finished part.

Figure 5:
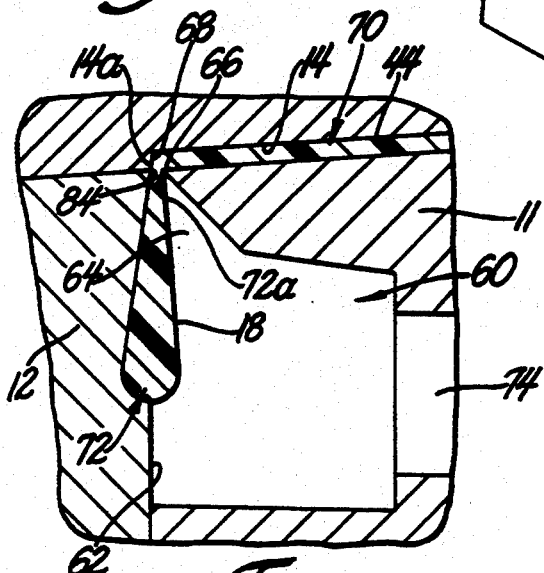
FIG. 5 is an enlarged fragmentary section of the region 5 in FIG. 3.
Figure 7:
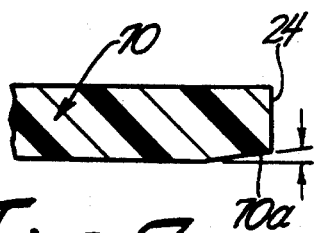
FIG. 7 is an enlarged sectional view taken on the line 7—7 of FIG. 6 looking in the direction of the arrows.

The first insert 44 includes a cutting edge 84 thereon (best shown in FIG. 5) that is located at the same inclination with respect to the edge 14a to provide a scissorlike cutting action along the edge 14a at the juncture 68 formed between the solidified part 70 and the solidified runner 72 so as to produce a smooth cutting of the runner 72 from the finished part 70. The resultant edge 70a formed thereon is near net shape. No additional trimming or finishing is required other than directing heated air or gas across edge 70a. Such heat will cause the surface to melt sufficiently to remove any slight imperfections in the sheared edge 70a.

By virtue of the aforedescribed apparatus, when the mold parts 11, 12 are initially opened, the driver members 74, 76 are separated by springs 86, 88 and positioned forwardly of the front surface 11a of the mold part 11. At the same time the springs 30, 32 will position the first insert 44 at a position in front of the inboard face or front face 12a of the mold part 12. During closure of the mold assembly 10, the insert 60 is located within the mold part 11 by engagement of the mold part 12 at the parting line. This causes the stripper bolts 80, 82 to be raised as shown in FIG. 2 with respect to the mold part 11 and causes the driver members 74, 76 to compress the springs 86, 88 such that the beak portion 64 on the insert 60 will be located along the parting line 16 so as to form the outboard surface of the runner passage 18. The first insert 44 is also located inboard of the parting line 16 by a pair of spacer bolts 90, 92 that are connected to the mold part 12 and have a head portion thereof engaged with shoulders 94, 96, respectively, formed on opposite sides of the retainer plate 38 as best shown in FIG. 2. The retainer plate 38 is thus spaced from the outboard surface 12b of the mold part 12. The retainer plate 38 engages the lifter heads 46 on the lifter rods 42 to pull the second insert 44 inwardly of the mold part 12 so as to cause the shearing or cutting edge 84 thereon to be located on the side of the passage 18 opposite to cutting edge 66. As a consequence, the mold parts 11, 12 are initially positioned such that the cutting edges 66, 84 are recessed in the mold parts so as to permit unrestricted flow of molten plastic through the gate passage 18 along the elongated inlet edge 22 to fill the mold cavity 14 formed between the mold parts 11, 12 corresponding to the shape of the finished part 70 shown in FIG. 6.

Following flow of molten fluid through the passage 18 into the mold cavity 14, the injection molded part is cooled and solidified to form the finished part 70. At this point, in accordance with the method of the present invention the ejector plate 38 is moved inwardly toward the mold part through the lost motion distance L as the mold part 11 begins to separate from the mold part 12. At this point, such separation causes the springs 86, 88 to move the driver members 74, 76 outwardly to position the insert 60 firmly against the surface 72a of the solidified runner 72 at the juncture 68 formed between the finished part 70 and the solidified runner 72. Such initial gripping action enhances the in-mold shearing of high aspect ratio parts since it holds the part along an extended length defining the longitudinal edge 70a thereof prior to any shearing action. Following the initial gripping action by the insert 60, further mold opening movement will cause the retainer plate 38 to engage the lifter rod 42 to cause the insert 44 and cutting edge 84 thereon to move along the inclined cutting line defined by the cutting edge 84 and the complementary cutting edge 66 formed on the beak portion 64. Additional opening movement will cause the first insert 44 to move outwardly of the inboard face 12a of the mold part 12. At this point, an extended pair of surfaces 44a and 44b on insert 44 that correspond to the inner shape of the finished part 70 will engage the finished part 70 along the sheared edge 70a thereof to eject the finished part 70 from the mold assembly. At the same time, such opening motion will cause the springs 86, 88 to extend sufficiently to cause the insert member 60 to eject the sheared runner 72.

The method of the present invention includes the steps of providing first and second mold parts with spring biased inserts that respectively eject a solidified part from one of the mold parts while ejecting a solidified runner from another of the parts; and wherein the method includes the steps of delaying the ejection action of the first insert so that the second insert can hold a solidified runner along a first cutting edge formed on the first insert and thereafter the second insert is actuated to cause a second cutting edge thereon to engage the gate following retention thereof by the first insert to cause the first and second cutting edges to smoothly cut a side edge portion of a part. Thereafter, the first and second inserts eject both the part and the runner from the mold assembly after forming a sheared longitudinally directed edge on one side portion of the high aspect ratio part.

It will thus be apparent that there has been provided, in accordance with the present invention, a method and apparatus for forming a smooth cut edge on a high aspect ratio part while separating runner material from the finished part while achieving the aims and advantages specified herein. It will of course be understood that the foregoing description is of preferred exemplary embodiments of the invention and that the invention is not limited to the specific embodiments shown. For instance, in the broader aspects of the invention, the runner could be formed along an edge portion that has a curvature formed therein rather than along a straight edge portion as shown in the illustrated embodiment. The runner nevertheless will be formed to evenly flow material throughout a mold cavity that defines the part. Additionally, it should be understood that while the cutting edges are shown at an inclination an acute degree of angulation thereof with respect to the edge formed on the part, other angulations will depend upon a particular application. Additionally, while a mechanical lost motion device is shown to prevent actuation of the ejector insert, it is readily understood that other devices for allowing a selective engagement of one of the inserts on one side of the runner to secure it in place prior to the cutting action can be accomplished. For example, a lock out mechanism can be provided to prevent operation of the ejector plate until the first insert has been placed in its gate gripping position as described hereinabove.

Various changes and modification will be apparent to those skilled in the art and all such variations and modifications are intended to come within the spirit and scope of the appended claims.

What is claimed is:

1. A mold degating assembly for a mold assembly having a first mold part and a second mold part relatively movable with respect to one another between a closed position and an open position and wherein one of the mold parts includes a runner passage therein and wherein the first mold part and second mold part define a cavity therebetween in their closed position including an inlet edge through which molten plastic is injected from the runner passage during a molding operation and wherein ejectors are provided within the first and second mold parts to eject a solidified injection mold part from the mold cavity and from the runner passages further comprising:

a first insert member and a second insert member;
said first insert member located in said first mold part; a first spring for biasing said first insert member outwardly of said first mold part when said first and second mold parts are in their open position; said first insert member operable to compress said first spring for positioning said first insert member inwardly of said first mold part when said first and second mold parts are in their closed position;
said second insert member located in said second mold part; a second spring for biasing said second insert outwardly of said second mold part when said first and second mold parts are in an open position; spacer means operable to hold said second insert inwardly of said second mold part and to compress said second spring;
said first insert and said second insert each having a cutting edge thereon respectively located on opposite sides of said runner passage at said inlet edge to said mold cavity;
said first insert engaging a solidified runner upon initial mold opening before said second insert engages the solidified runner; said spacer means including a retainer plate movable following clamping of said first insert against said solidified runner to move said cutting edge on said second insert against a juncture between a finished part and said solidified runner along the inlet edge and against one side of said solidified runner while the cutting edge on said first insert cuts the juncture between the finished part and said solidified runner on the opposite side of said solidified runner during further opening movement of the first and second mold parts.

2. The mold degating apparatus of claim 1 further comprising:
said spacer means including an undercut surface on said retainer plate and a lifter head portion; spacer bolts; coacting surfaces on said retainer plate and said spacer bolts engageable when said first and second mold parts are closed to compress said second spring and to engage said coacting surfaces for holding said second insert within said second mold part when said mold assembly is closed; said coacting surfaces separating following initial opening of said mold assembly to cause said retainer plate to lift said second insert from said second mold part for ejecting a finished mold part therefrom.

3. The molding degating apparatus of claim 1 further comprising: said first and second cutting edges having an elongated cutting edge thereon; each of said cutting edges being located in an acute angular relationship along a longitudinal edge of said part.

4. The mold degating apparatus of claim 1 further comprising said first insert including a surface portion thereon forming part of said runner passage and including a beak portion on one side thereof; said beak portion having said first cutting edge formed therealong.

5. The mold degating apparatus of claim 1 further comprising said second insert being formed as an ejector member having a head portion and a side portion; said cutting edge on said second insert formed on said second side portion at the juncture between a mold part and said runner passage.

6. The mold degating apparatus of claim 1 further comprising said first and second cutting edges being located in spaced relationship with respect to one another and within said first and second molds when said first and second mold parts are initially closed.

7. A method for degating runner material from an injection molded part comprising the steps of providing a mold assembly including first and second mold parts having a cavity formed therein defining a part with a side edge; providing a runner passage in one of said mold parts for supplying molten material through a side inlet into the mold cavity at the side edge thereof; injecting molten material through the runner passage into the mold cavity and solidifying the injection molded material therein; clamping one side of a runner at the juncture between the runner and a solidified part; thereafter moving first and second cutting edges against the juncture on opposite sides thereof to form a shearing action between the first cutting edge and the second cutting edge to cleanly cut the juncture between runner material and a solidified part material along the side edge of the part before ejection thereof from the mold assembly; and providing the clamping by spring biasing an insert against one side of the runner material.

8. The method of claim 7 further comprising: delaying cutting by providing a lost motion connection between the second cutting edge and the second mold member.

9. The method of claim 7 further comprising: the moving of said second shearing edge and the cutting action thereof being concurrently performed with the ejection of a solidified part from the second mold part.

10. The method of claim 8 further comprising: said delayed cutting action being followed by ejection of said runner material from said first mold part.

* * * * *

UNITED STATES PATENT AND TRADEMARK OFFICE
CERTIFICATE OF CORRECTION

PATENT NO. : 5,435,956
DATED : July 25, 1995
INVENTOR(S) : Harold F. McGrory

It is certified that error appears in the above-indentified patent and that said Letters Patent is hereby corrected as shown below:

Column 8, line 47, delete "cutting" and insert therefor --shearing--.

Signed and Sealed this

Twenty-first Day of November, 1995

Attest:

BRUCE LEHMAN

Attesting Officer

Commissioner of Patents and Trademarks